United States Patent [19]

Tanaka et al.

[11] Patent Number: 4,927,247
[45] Date of Patent: May 22, 1990

[54] OBJECTIVE LENS FOR OPTICAL DISK SYSTEM AND OPTICAL HEAD USING THE SAME

[75] Inventors: Yasuhiro Tanaka, Ashiya; Masaaki Sunohara, Nishinomiya; Yasuo Nakajima, Ibaraki; Shinichi Tanaka, Kyoto, all of Japan

[73] Assignee: Matsushita Electric Industrial Co., Ltd., Osaka, Japan

[21] Appl. No.: 343,256

[22] Filed: Apr. 26, 1989

[51] Int. Cl.$^5$ .............................. G02B 13/18
[52] U.S. Cl. ................................. 350/432
[58] Field of Search ................ 350/409, 432

[56] References Cited

U.S. PATENT DOCUMENTS

| | | | |
|---|---|---|---|
| 4,027,952 | 6/1977 | Hugues | 350/432 |
| 4,449,792 | 5/1984 | Arai et al. | 350/432 |
| 4,571,034 | 2/1986 | Nakamura | 350/432 |
| 4,655,556 | 4/1987 | Kajitani | 350/432 |
| 4,765,723 | 8/1988 | Takamura | 350/432 |
| 4,768,867 | 9/1988 | Suda | 350/432 |
| 4,842,388 | 6/1989 | Tanaka et al. | 350/432 |

FOREIGN PATENT DOCUMENTS

| | | |
|---|---|---|
| 57-76512 | 5/1982 | Japan . |
| 60-232519 | 11/1985 | Japan . |
| 62-59912 | 3/1987 | Japan . |
| 62-217214 | 9/1987 | Japan . |

Primary Examiner—Paul M. Dzierzynski
Attorney, Agent, or Firm—Wenderoth, Lind & Ponack

[57] ABSTRACT

A lens controls the chromatic aberration of an objective lens for practical use in an optical disk system. The lens has first and second aspherical surfaces each providing a positive refractive power for focusing a light through a transparent plate and satisfies a condition:

$$\left| \frac{f_L}{\nu_L} - \frac{n_c - 1}{n_c^2} \cdot \frac{d_c}{\nu_c} \right| < \frac{\lambda}{3NA^2}$$

where $f_L$=focal length of the lens, $d_c$=thickness of the transparent plate, $n_c$=refractive index of the transparent plate, $\lambda$=center wavelength of the light, NA=numerical apperture of the lens, $\nu_L$=local dispersion of the lens, and $\nu_c$=local dispersion of the transparent plate. The local dispersion of each element is expressed by:

$$\nu = -\frac{n_\lambda - 1}{n_{\lambda+5} - n_{\lambda-5}}$$

where $n_{80}$ is refractive index at a center wavelength $\lambda$ nm, $n_{\lambda+5}$ a refractive index at $\lambda+5$ nm, and $n_\lambda-5$ a refractive index at $\lambda-5$ nm.

7 Claims, 5 Drawing Sheets

OBJECTIVE LENS FOR OPTICAL DISK SYSTEM AND OPTICAL HEAD USING THE SAME

BACKGROUND OF THE INVENTION

1. Field of the Invention

The present invention relates to an optical head for an optical disk such as a video disk, an audio disk, an optical memory disk, and the like, and more particularly to an objective lens used in the optical head.

2. Description of the Prior Art

The objective lens used in an optical head requires correction of aberration to the diffraction limit. Additionally, the objective lens is desired to be small in size and light in weight so as to be capable of moving quickly during the tracking or focusing servo-operation. Hence, a single aspherical lens has been proposed as disclosed in U.S. Pat. Nos. 4,027,952, 4,449,792, 4,571,034, and 4,655,556, and Japanese Patent Applications Laid-Open Nos. 57-76512 and 62-59912.

The conventional objective lens for optical head has the following disadvantage. Since the laser diode oscillates at approximately a single wavelength, the objective lens is designed to correct for aberration in respect to the one wavelength. Generally, the corrected aberration of the lens to the single wavelength changes less even if the oscillation wavelength of the laser diode varys in the order of about 10 nm. This is because the focal point of the lens is kept compensated by the servo-operation of auto-focusing.

However, in the erasable optical disk system, the power of the laser diode must be changed. For example, the power of 3 mW is required for reading data from the optical disk while the power of 40 to 60 mW is needed for erasing the recorded data. When the laser power is changed, the wavelength of the laser diode output will often vary instantly due to a mode hop. The variation ranges 5 nm to 10 nm in general. Since one of the reading, recording and erasing modes is switched to another quickly, the wavelength of the laser diode output varies in a moment. The wavelength change caused by the power variation of the laser diode often exceeds the controllable range of the optical head by the auto-focusing servo system, so that the displacement of the focal point due to chromatic aberration of the lens cannot be compensated. This causes a failure of reading data just after a change in the wavelength.

For solving such a problem, lenses corrected for chromatic aberration have been proposed in Japanese Patent Application Laid-Open Nos. 60-232519 and 62-217214. These lenses each consist of 4 to 5 elements, and thus will be high in cost and require a lens barrel which is finished with high accuracy. Additionally, the lens itself becomes heavy in weight and energy-saving in the entire arrangement will be difficult.

SUMMARY OF THE INVENTION

A primary object of the present invention is to provide an objective lens for an optical disk system and an optical head employing a single aspherical lens cooperative with a transparent substrate of an optical disk so that a displacement of focal point caused by a change in the wavelength of a laser diode can be kept within a practically allowable range.

For achieving the object, an objective lens according to the present invention has opposite first and second aspherical surfaces each providing a positive refractive power for focusing a light to form a light spot through a transparent plate (transparent substrate of an optical disk) and satisfies substantially the following conditions:

$$\left| \frac{f_L}{\nu_L} - \frac{n_C - 1}{n_C^2} \cdot \frac{d_C}{\nu_C} \right| < \frac{\lambda}{3NA^2} \quad (1)$$

where,
- $f_L$: focal length of the lens,
- $d_c$: thickness of the transparent plate,
- $n_c$: refractive index of the transparent plate,
- $\lambda$: center wavelength of the light
- NA: numerical of aperture of the lens,
- $\nu_L$: local dispersion of the lens, and
- $\nu$: local dispersion of the transparent plate.

Supporsing, at each of the lens and the transparent plate, a refractive index at the center wavelength $\lambda$ by $n_{80}$; a refractive index at a wavelength 5 nm longer than the center wavelength be $n_{80}+5$; and a refractive index at a wavelength 5 nm shorter than the center wavelength be $n_{80}-5$, the local dispersion ($\nu_L$ or $\nu_c$) is expressed by:

$$\nu = -\frac{n_\lambda - 1}{n_\lambda + 5 - n_\lambda - 5} \quad (2)$$

Accordingly, the local dispersion of the objective lens and the thickness and local dispersion of the transparent plate are selected such that the displacement of the focal point of the objective lens caused by a change in the wavelength of the laser beam can be kept within the depth of focus of the objective lens.

The objective lens and the optical head using the same according to the present invention provide the following advantages.

(1) The chromatic aberration which is hardly eliminated with the use of a single lens, can be reduced to a practically acceptable range with the combination of a single lens and an optical disk.

(2) Since a small, light-weight, and cheap single lens is used as the objective lens, the optical head can be improved in high-speed operation, energy consumption, and production cost.

(3) The working distance can be kept at least 0.4 mm, so that collision of the lens with the lens can be avoided.

(4) The transparent plate may have a thickness of at least 0.8 mm so that dusts or injuries on the disk will hardly affect the single write and read operations.

(5) A known forming method can be employed for mass-producing the objective lens of the present invention at low cost.

DESCRIPTION OF THE PREFERRED EMBODIMENT

Figure 1:
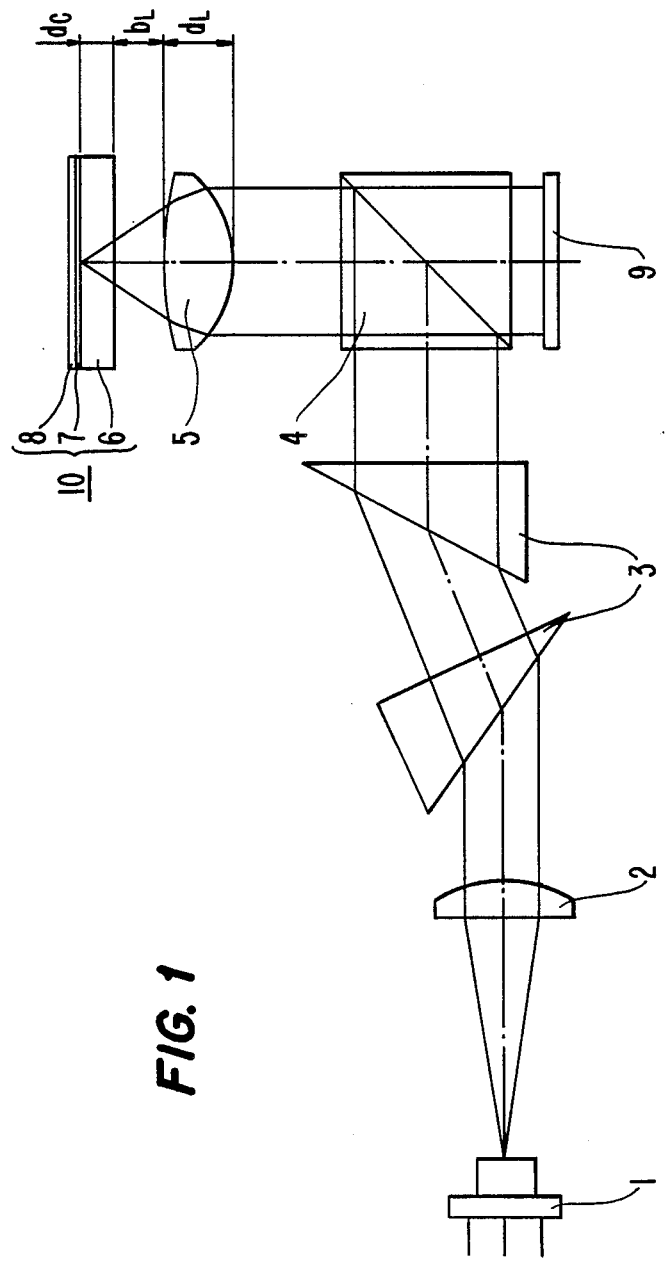
FIG. 1 is a schematic structural diagram showing an arrangement of an objective lens and an optical head representing one embodiment of the present invention.
Figure 2A:
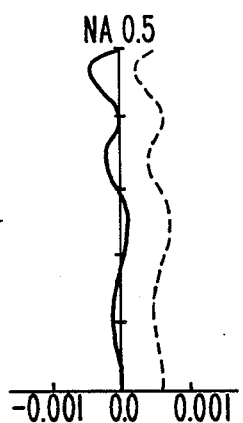
FIGS. 2 to 5 are diagrams of aberrations representing Examples 1 to 4, respectively, according to the present invention, wherein 1 . . . laser diode; 2 . . . collimator lens; 3 . . . beam shaper prism; 4 . . . beam splitter; 5 . . . objective lens; 6 . . . transparent substrate; 7 . . . recording medium layer; 8 . . . protective layer; 9 . . . optical disk; and 10 . . . photo-detector.
Figure 2B:
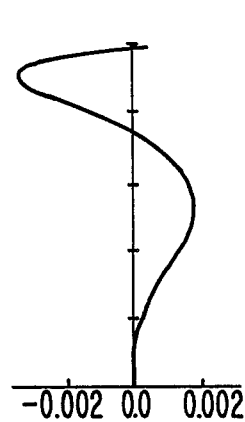
Figure 2C:
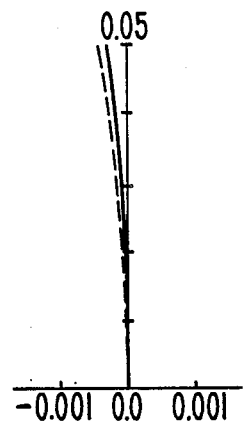
Figure 2D:
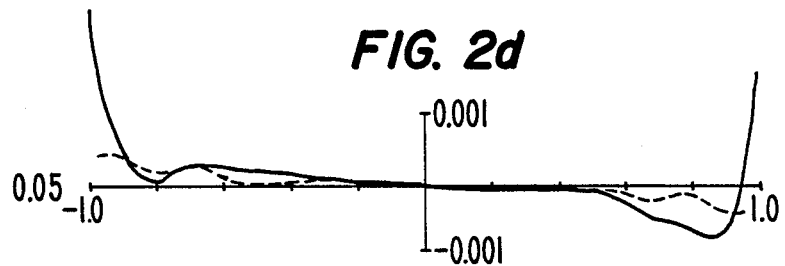
Figure 2E:
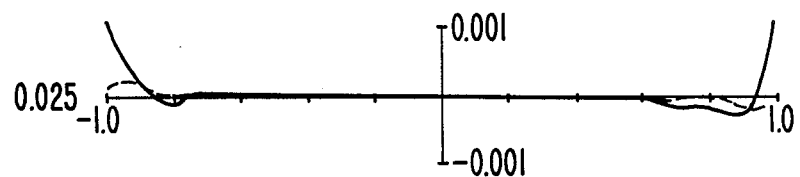
Figure 2F:
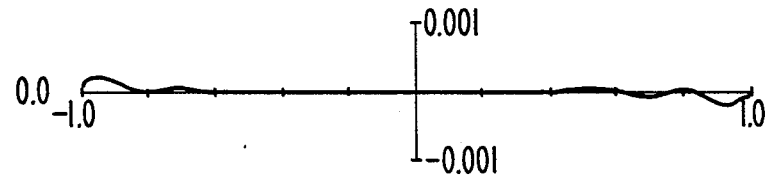
Figure 3A:
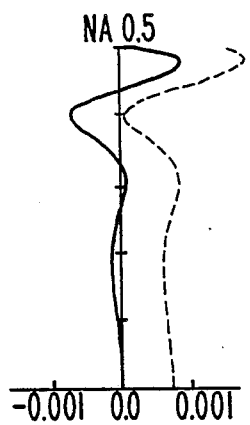
Figure 3B:
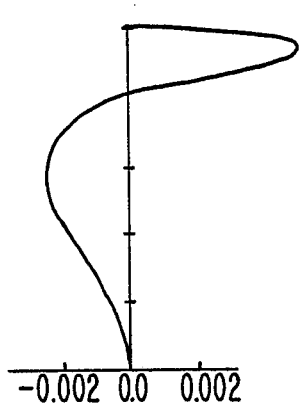
Figure 3C:
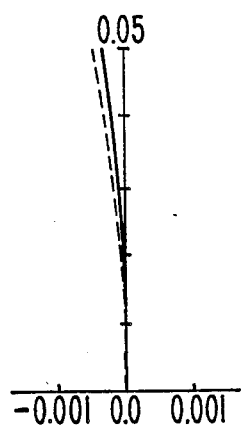
Figure 3D:
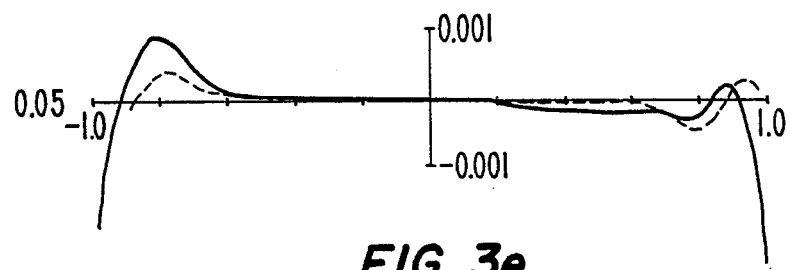
Figure 3E:
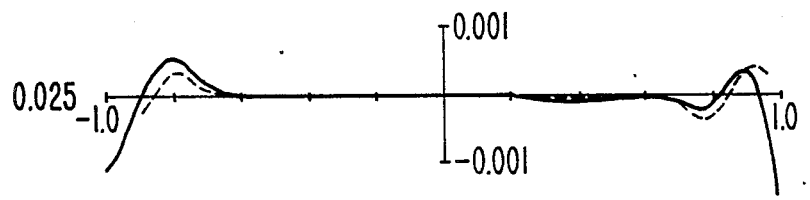
Figure 3F:
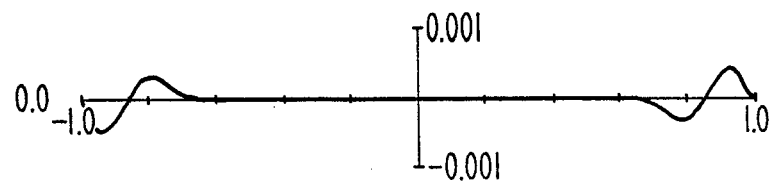
Figure 4A:
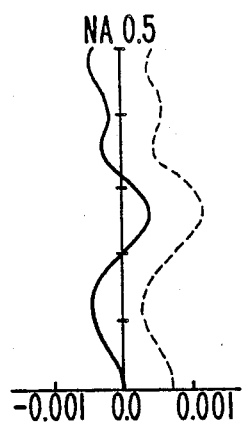
Figure 4B:
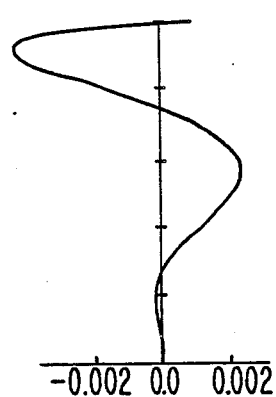
Figure 4C:
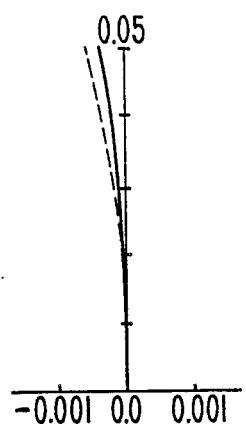
Figure 4D:
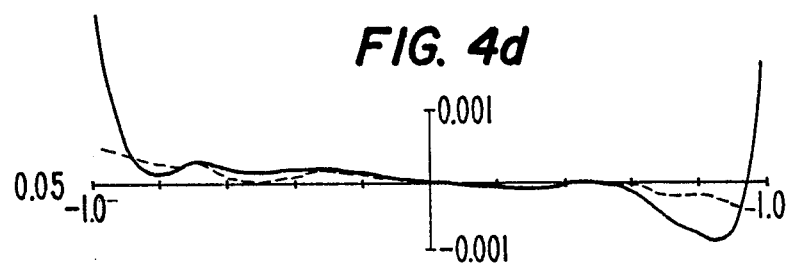
Figure 4E:
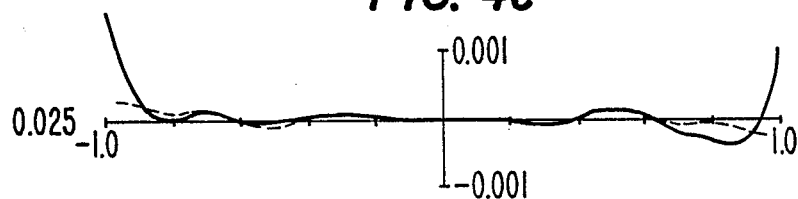
Figure 4F:
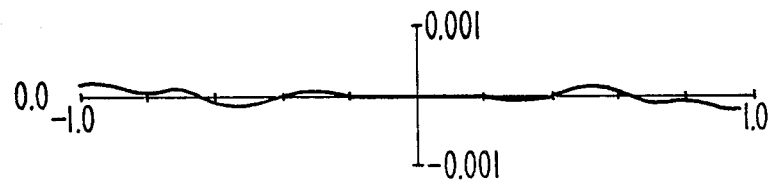
Figure 5A:
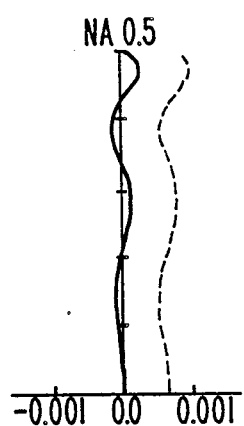
Figure 5B:
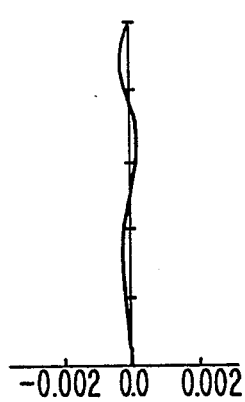
Figure 5C:
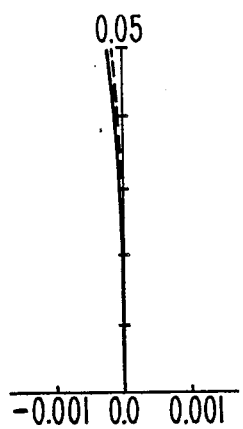
Figure 5D:
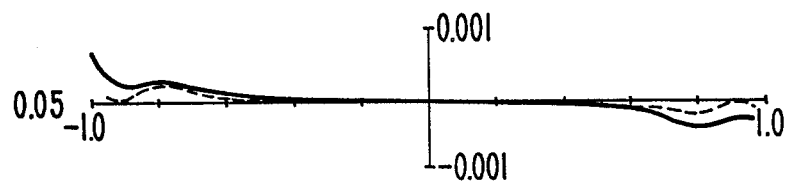
Figure 5E:
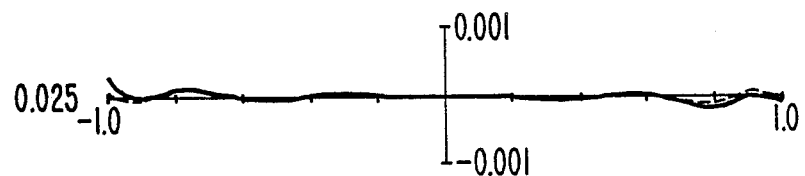
Figure 5F:
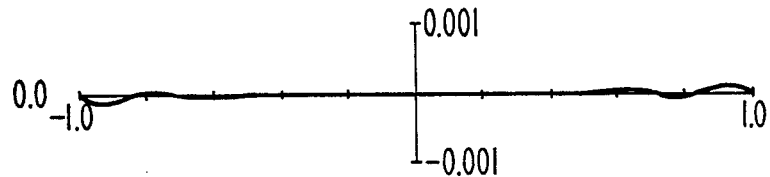

FIG. 1 is a schematic view showing the arrangement of an objective lens and an optical head representing one embodiment of the present invention. Light irradiated from a laser diode 1 becomes a parallel beam through a collimator lens 2. The distribution of light intensity of the light irradiated from the laser diode 1 is in an elliptical form, which is converted by a beam shaper prism 3 to an approximately circular shape. The parallel beam is reflected by a beam splitter 4 and enters an objective lens 5 to form a light spot on a surface of a recording medium layer 7 through a transparent substrate 6 of an optical disk 10. The recording medium layer 7 is protected by a protective layer 8. The light reflected by the surface of the recording medium layer 7 returns to the objective lens 5 and is fed to a photodetector 9 through the beam splitter 4.

It is designated herein that the designed wavelength for the objective lens is 800 nm equal to the oscillation wavelength of the laser diode. Assuming that a change in the wavelength due to a mode hop of the laser diode is within 10 nm at maximum, the local dispersion $v$ of each optical element within a range of ±5 nm from the center wavelength of 800 nm is defined as:

$$v = -\frac{n_{e00} - 1}{n_{e05} - n_{795}} \quad (3)$$

where n is the refractive index and its accompanying numeral represents a given wavelength (denoted in nm). For example, in the case of a glass material whose refractive index to the d-line is 1.51633 and whose dispersion is 64.1, $v=2600$ is obtained from $n_{800}=1.51032$, $n_{795}=1.51042$, and $n_{805}=1.51022$.

When the focal length of the objective lens is $f_L$ and the local dispersion is $v_L$, the variation $\Delta f_L$ of the lens focal length due to a 10 nm change of the wavelength is:

$$\Delta f_L = \frac{f_L}{v_L} \quad (4)$$

In the optical disk system, the laser beam is focused to form a light spot on a back surface of the transparent substrate having a thickness of several millimeters. Accordingly, the transparent substrate formed of a parallel planar plate is regarded as a part of the optical system. Suppose that the transparent substrate has a thickness $d_c$, a refractive index $n_c$, and a local dispersion $\Delta_c$. Since the transparent substrate is a parallel planar plate, it does not change the focal length of the objective lens, but it changes the focal point due to the positional change of the principal point. The focal point displacement s is expressed as:

$$s = d_c(1 - 1/n_c) \quad (5)$$

Then, if the refractive index changes by $n_c$, the variation s of the focal point is:

$$\Delta_s = \frac{d_c \cdot \Delta n_c}{n_c^2} \quad (6)$$

While the local dispersion $_c$ of the transparent substrate is:

$$v_c = -\frac{n_c - 1}{\Delta n_c} \quad (7)$$

Thus, the variation s of the focal point due to a change of the refractive index is determined by:

$$\Delta_s = -\frac{n_c - 1}{n_c^2} \cdot \frac{d_c}{v_c} \quad (8)$$

Accordingly, from the equations (4) and (8), the variation g of the focal point in relation to the effects of both the lens and the transparent substrate, is:

$$\Delta g = \frac{f_L}{v_L} - \frac{n_c - 1}{n_c^2} \cdot \frac{d_c}{v_c} \quad (9)$$

The depth of focus of the lens is expressed by:

$$p \cdot \frac{\lambda}{NA^2}$$

where p is a constant determined by the distribution of light quantity, approximately 0.4 in uniform distribution. The focal point must be within the focal depth for recording, erasing, and playing back of data in the optical disk system. However, defocus would occur in practice due to electrical characteristics of the focus servo system in addition to the variation of the focal point resulting from a change in the wavelength. It is thus be determined that the displacement of the focal point caused by a change in the wavelength should be less than the focal depth. The focal point can be kept within the focal depth even when the wavelength varies in the range of 10 nm if the following condition is satisfied.

$$\left| \frac{f_L}{v_L} - \frac{n_c - 1}{n_c^2} \cdot \frac{d_c}{v_c} \right| < \frac{\lambda}{3NA^2} \quad (10)$$

When the focal length $f_L$ of the objective lens is reduced or the thickness $d_c$ of the transparent substrate is increased in the formula (10), the displacement of the focal point becomes smaller. This results in a decrease in the working distance $b_L$ of the lens, i.e., the air gap between the lens and the transparent substrate. The narrow working distance may cause the objective lens to collide with the transparent substrate, resulting in damages of the both. It is good practice to keep the working distance $b_L$ of at least 0.4 mm between the objective lens and the transparent substrate.

Although the working distance can be increased by decreasing the thickness $d_c$ of the transparent substrate, the excessively thin transparent substrate may cause effects of dusts or flaws on the disk on the light spot, causing error in writing or reading of the data. Hence, the thickness $d_c$ of the transparent substrate may preferably at least 0.8 mm.

In the following Examples, the aspherical shape is expressed as:

$$X = \frac{Ch^2}{1 + \sqrt{1 - (1 + K_j)C^2h^2}} + \sum_{i=2} A_{ij}^{(j)} h^{2i}$$

where,

X: distance between a point on the aspherical surface spaced h from the optical axis and a tangential plane to the vertex of the aspherical surface,
h: height from the optical axis,
C: curvature at the vertex of the aspherical surface (=1/R),
$K_j$: conic constant of a j-th surface,
$A_{2i}$: 2i-th order aspherical coefficient of the j-th surface (in which i is an integer of 2 or more),
$f_L$: focal length of the lens,
$d_L$: thickness of the lens,
$R_j$: radius curvature of the j-th surface,
$n_L$: refractive index of the lens at a wavelength of 800 nm,
$\nu_L$: local dispersion of the lens,
$d_c$: thickness of the transparent substrate,
$n_c$: refractive index of the transparent substrate at a wavelength of 800 nm,
NA: numerical aperture of the lens,
$b_L$: distance between the lens and the transparent substrate, and
$\Delta t$: displacement of the focal point at a wavelength ranging from 795 nm to 805 nm.

FIGS. 2 to 5 illustrate aberrations in Examples 1 to 4, respectively. Throughout FIGS. 2 to 5, (a) represents spherical aberration; (b) sine condition; (c) astigmatism; and (d), (e) and (f) coma aberration. As shown in the diagram of spherical aberration, the solid line represents aberration at a wavelength of 795 nm while the dotted line represents aberration at 805 nm. Similarly in the diagram of astigmatism, the solid line represents sadittal curvature of field while the dotted line represents meridional curvature of field. In the diagrams of coma aberration, the solid line represents meridional coma aberration, the dotted line represents sagittal coma aberration, and the one-dot chain line represents valleculate aberration.

Example 1

| | |
|---|---|
| $f_L$ = 3.5 | $b_L$ = 1.2504 |
| $d_L$ = 1.80 | NA = 0.50 |
| $n_L$ = 1.43084 | $\nu_L$ = 3900 |
| $R_1$ = 2.050 | $R_2$ = −4.195 |
| $K_1$ = −.5453524 | $K_2$ = −.6086752 × $10^1$ |
| $A_4^{(1)}$ = −.7050449 × $10^{-3}$ | $A_4^{(2)}$ = .7675075 × $10^{-2}$ |
| $A_6^{(1)}$ = −.3878262 × $10^{-3}$ | $A_6^{(2)}$ = −.2239316 × $10^{-2}$ |
| $A_8^{(1)}$ = .1043915 × $10^{-3}$ | $A_8^{(2)}$ = .3860439 × $10^{-3}$ |
| $A_{10}^{(1)}$ = −.1152889 × $10^{-3}$ | $A_{10}^{(2)}$ = .8900087 × $10^{-4}$ |
| $d_c$ = 2.0 | $\nu_c$ = 2580 |
| $n_c$ = 1.51032 | $\Delta_t$ = 0.000601 |

Example 2

| | |
|---|---|
| $f_L$ = 4.0 | $b_L$ = 1.4752 |
| $d_L$ = 2.20 | NA = 0.50 |
| $n_L$ = 1.48581 | $\nu_L$ = 2780 |
| $R_1$ = 2.380 | $R_2$ = −7.384 |
| $K_1$ = −.7578067 × $10^{-1}$ | $K_2$ = .1375783 × $10^2$ |
| $A_4^{(1)}$ = −.3032618 × $10^{-2}$ | $A_4^{(2)}$ = .1643672 × $10^{-1}$ |
| $A_6^{(1)}$ = −.2759916 × $10^{-3}$ | $A_6^{(2)}$ = −.1105545 × $10^{-3}$ |
| $A_8^{(1)}$ = .3921291 × $10^{-4}$ | $A_8^{(2)}$ = .4746900 × $10^{-3}$ |
| $A_{10}^{(1)}$ = −.1444792 × $10^{-4}$ | $A_{10}^{(2)}$ = .8963654 × $10^{-4}$ |
| $d_c$ = 2.4 | $\nu_c$ = 1250 |
| $n_c$ = 1.82361 | $\Delta_t$ = 0.000752 |

Example 3

| | |
|---|---|
| $f_L$ = 4.0 | $b_L$ = 2.1658 |
| $d_L$ = 2.00 | NA = 0.50 |
| $n_L$ = 1.43084 | $\nu_L$ = 3900 |
| $R_1$ = 2.250 | $R_2$ = −5.392 |
| $K_1$ = −.3422186 | $K_2$ = −.5206780 × $10^1$ |
| $A_4^{(1)}$ = −.2755220 × $10^{-2}$ | $A_4^{(2)}$ = .6712725 × $10^{-2}$ |
| $A_6^{(1)}$ = −.5986182 × $10^{-3}$ | $A_6^{(2)}$ = −.1140618 × $10^{-2}$ |
| $A_8^{(1)}$ = .1178607 × $10^{-4}$ | $A_8^{(2)}$ = −.2540221 × $10^{-3}$ |
| $A_{10}^{(1)}$ = −.6066795 × $10^{-4}$ | $A_{10}^{(2)}$ = .3876677 × $10^{-4}$ |
| $d_c$ = 1.2 | $\nu_c$ = 1780 |
| $n_c$ = 1.57153 | $\Delta_t$ = 0.000734 |

Example 4

| | |
|---|---|
| $f_L$ = 4.0 | $b_L$ = 1.5529 |
| $d_L$ = 3.00 | NA = 0.50 |
| $n_L$ = 1.45228 | $\nu_L$ = 3770 |
| $R_1$ = 2.320 | $R_2$ = −4.907 |
| $K_1$ = −.2385728 | $K_2$ = −.1163513 × $10^2$ |
| $A_4^{(1)}$ = −.2728734 × $10^{-2}$ | $A_4^{(2)}$ = .8177931 × $10^{-2}$ |
| $A_6^{(1)}$ = −.3412453 × $10^{-3}$ | $A_6^{(2)}$ = .9948354 × $10^{-3}$ |
| $A_8^{(1)}$ = .2774987 × $10^{-5}$ | $A_8^{(2)}$ = −.3751862 × $10^{-4}$ |
| $A_{10}^{(1)}$ = −.1177334 × $10^{-4}$ | $A_{10}^{(2)}$ = .5885132 × $10^{-4}$ |
| $d_c$ = 1.4 | $\nu_c$ = 1540 |
| $n_c$ = 1.67405 | $\Delta_t$ = 0.000638 |

The equation (9) is an approximate equation without consideration of the thickness of the lens. In each Example, the displacement $\Delta t$ of the focal point between the wavelengths of 795 nm and 805 nm is a value calculated with consideration of the lens thickness. Generally, the displacement of the focal point is smaller when calculated with consideration of the thickness of the lens than without consideration. Thus, the equation (9) is practical.

The chromatic aberration of the collimator lens also affects the focal point of the objective lens. However, it is general that NA of a collimator lens is less than that of an objective lens. For example, if NA of the objective lens is 0.5 and NA of the collimator lens is 0.25, the objective lens will be involved with ¼ of the chromatic aberration of the collimator lens. The collimator lens is commonly used in fixed state during both the servo-operations of focusing and tracking and will thus be less considered in weight. Accordingly, the collimator lens can be constituted by plural elements to act in combination as an achromatic lens.

What is claimed is:

1. An objective lens for an optical disk system, having opposite first and second aspherical surfaces each providing a positive refractive power for focusing a light to form a light spot through a transparent plate, and satisfying substantially the following condition:

$$\left| \frac{f_L}{\nu_L} - \frac{n_c - 1}{n_c^2} \cdot \frac{d_c}{\nu_c} \right| < \frac{\lambda}{3NA^2}$$

where,
$f_L$: focal length of the lens,
$d_c$: thickness of the transparent plate,
$n_c$: refractive index of the transparent plate,
$\lambda$: center wavelength of the light,
NA: numerical apperturs of the lens,
$\nu_L$: local dispersion of the lens, and $\nu_c$: local dispersion of the transparent plate, the local dispersion being expressed by:

$$\nu = -\frac{n_\lambda - 1}{n_{\lambda+5} - n_{\lambda-5}}$$

where $n_\lambda$ is a refractive index at a center wavelength $\lambda$ of the light, $n_{\lambda+5}$ is a refractive index at a wavelength 5 nm longer than the center wavelength of the light, and $n_{\lambda-5}$ is a refractive index at a wavelength 5 nm shorter than the center wavelength of the light.

2. An objective lens as defined in claim 1, wherein a distance between the lens and the transparent plate is at least 0.7 mm.

3. An objective lens as defined in claim 1, wherein the thickness of the transparent plate is at least 0.8 mm.

4. An optical head comprising: an objective lens for focusing a light from a light source on an information recording medium; light separator means for separating a light reflected from the information recording medium and passed through the objective lens from the light from the light source; and photo-detecting means for detecting the separated reflected light, the objective lens having opposite first and second aspherical surfaces each providing a positive refraction for focusing the light through a transparent substrate of the recording medium and satisfying substantially the following condition:

$$\left| \frac{f_L}{\nu_L} - \frac{n_c - 1}{n_c^2} \cdot \frac{d_c}{\nu_c} \right| < \frac{\lambda}{3NA^2}$$

where,
- $f_L$: focal length of the lens,
- $d_c$: thickness of the transparent substrate,
- $n_c$: refractive index of the transparent substrate,
- $\lambda$: center wavelength of the light.
- NA: numerical of appertures of the lens,
- $\nu_L$: local dispersion of the lens, and
- $\nu_c$: local dispersion of the transparent substrate, the local dispersion being expressed by:

$$\nu = -\frac{n_\lambda - 1}{n_{\lambda+5} - n_{\lambda-5}}$$

where $n_\lambda$ is a refractive index at a center wavelength $\lambda$ of the light, $n_{\lambda+5}$ is a refractive index at a wavelength 5 nm longer than the center wavelength of the light, and $n_{\lambda-5}$ *is a refractive index at a wavelength* 5 nm shorter than the center wavelength of the light.

5. An optical head as defined in claim 4, wherein a distance between the objective lens and the transparent substrate is at least 0.7 mm.

6. An optical head as defined in claim 4, wherein the thickness of the transparent substrate is at least 0.8 mm.

7. An optical head as defined in claim 4, further comprising a collimator means for arranging the light irradiated from the light source into a parallel light.

* * * * *